United States Patent
Brown (10) Patent No.: US 7,672,343 B2
(45) Date of Patent: Mar. 2, 2010

(54) SYSTEM AND METHOD FOR HIGH POWER LASER PROCESSING

(75) Inventor: David C. Brown, Northborough, MA (US)

(73) Assignee: GSI Group Corporation, Bedford, MA (US)

( * ) Notice: Subject to any disclaimer, the term of this patent is extended or adjusted under 35 U.S.C. 154(b) by 0 days.

(21) Appl. No.: 11/483,326

(22) Filed: Jul. 7, 2006

(65) Prior Publication Data

US 2007/0029289 A1 Feb. 8, 2007

Related U.S. Application Data

(60) Provisional application No. 60/698,592, filed on Jul. 12, 2005, provisional application No. 60/779,780, filed on Mar. 7, 2006.

(51) Int. Cl.
*H01S 3/121* (2006.01)
(52) U.S. Cl. .............. 372/15; 372/9; 372/92; 372/98; 372/99; 359/495; 219/121.6
(58) Field of Classification Search ............ 372/98, 372/101, 9, 15, 92, 99; 359/495; 219/121.6
See application file for complete search history.

(56) References Cited

U.S. PATENT DOCUMENTS

| | | | | |
|---|---|---|---|---|
| 4,580,270 A * | 4/1986 | Johnson et al. | ............. | 372/107 |
| 4,689,467 A * | 8/1987 | Inoue | ...................... | 219/121.6 |
| 5,739,951 A * | 4/1998 | Naganuma | .................. | 359/494 |
| 6,393,035 B1 * | 5/2002 | Weingarten et al. | ........... | 372/18 |
| 6,480,330 B1 * | 11/2002 | McClay et al. | .............. | 359/359 |
| 6,667,999 B2 | 12/2003 | Hasson et al. | | |
| 6,810,060 B2 | 10/2004 | Vetrovec | | |
| 6,818,855 B2 * | 11/2004 | Takeda et al. | ............ | 219/121.6 |
| 2005/0248858 A1 * | 11/2005 | Weber et al. | ................ | 359/811 |

OTHER PUBLICATIONS

S. Heinemann, "Going with the FLO," Industrial Laser Solutions, Jun. 2005, pp. 21-23.
W. Wolfe and G. Zissis (ed.), "The Infrared Handbook," Infrared Information and Analysis (IRIA) Center, Environmental Research Institute of Michigan, 1978, p. 7-114.
Optics Catalog, II-VI Inc., Specialists in infrared technology, Saxonburg, Pennsylvania, 1990, 4 pages.

* cited by examiner

*Primary Examiner*—Minsun Harvey
*Assistant Examiner*—Yuanda Zhang
(74) *Attorney, Agent, or Firm*—Gauthier & Connors LLP (57) ABSTRACT

A high power laser processing system is disclosed that includes a laser source and at least one optical element. The laser source provides a high power laser illumination of a first wavelength. The optical element includes a substrate that is substantially transparent to the first wavelength illumination, at least one highly reflective coating on a first side of the substrate, and at least one anti-reflective coating on a second side of the substrate.

25 Claims, 5 Drawing Sheets

SYSTEM AND METHOD FOR HIGH POWER LASER PROCESSING

PRIORITY

The present application claims priority to U.S. Provisional Patent Application Ser. No. 60/698,592 filed Jul. 12, 2005 as well as U.S. Provisional Patent Application Ser. No. 60/779,780 filed Mar. 7, 2006.

BACKGROUND

The invention relates to laser processing systems, and relates in particular to optical elements for use in high power laser processing systems.

The power output of conventional commercially available lasers may be provided at the multi kilowatt level. Because lasers have low overall power efficiency, they become heated by the input power that is not converted into useful output. At a typical overall efficiency of 10%, very large amounts of heat accumulate in the laser, and this heat is typically removed by means of circulating cooled water, forced air, or a combination thereof. The fixed or semi-fixed optical elements used to bend, focus, and direct the output laser beam also become heated by the waste heat of the laser, but more importantly are irradiated by the laser beam itself. Because these optical elements cannot be either completely transparent or perfectly reflective, they absorb and convert a very small fraction of the laser power into additional heat, which heat must also be removed. The cavity mirrors, folding flats, collimating telescope and the like are generally part of the laser package itself, and so can easily be cooled by whatever means is employed for the laser.

The system used to direct the laser beam onto a work piece however, commonly called a scan head, is often physically remote from the laser itself, and may even be in the form of a robot end-effector or otherwise dynamically connected to the laser itself. This remote and dynamic connection between the laser and the process makes it very difficult to cool the scanning system using the same cooling system built into the laser, and it is typically difficult and expensive to provide an equivalent cooling system at the location of the scanner.

The reason that the scanning system needs to be cooled is as follows. The laser beam irradiates the optics, which typically include one or two mirrors and a focusing lens. Although these optics are outside the hot laser environment and the laser beam is expanded at their location to reduce the power density of the beam, not all of the power impinging on the mirror or mirrors is reflected. A small fraction of the laser beam power, typically 0.3% to 0.5% becomes available to heat each mirror. At a beam power of 6 kW, 0.3% is 30 Watts, which, if absorbed, would quickly heat the mass of the mirror to a temperature that would destroy it.

The mirrors used in the laser itself are fixed in position, and therefore allow robust thermal contact with the frame of the laser, which if actively cooled provides a conduction path of low thermal resistance to the active cooling medium. The mirrors used to direct the laser beam to the work in the other hand, are generally supported on a slender actuator shaft, typically that of a limited-rotation torque motor. For reasons relating to the sensitivity of the motor itself to the influence of heating, the shaft is intentionally made of a material with high thermal resistance, such as stainless steel. As a result, the only effective cooling mechanism for the mirror is natural convection.

It can be shown that the loss of heat by free convection from a flat plate is about $6.6 \times 10^{-2}$ W/cm$^2$ of plate surface when the surrounding air is at, for example, 20° C. and the plate is at, for example, 50° C. This puts an upper limit on the power that the plate, a mirror in this case, can absorb if it desired to keep its temperature at or below 50° C. This is typically desired because otherwise the figure of the mirror is likely to change away from the ideal, and also because the performance of the actuator to which it is attached is, in general, degraded by heat.

The conventional process for designing a laser processing mirror has been to choose a beam aperture, and then a mirror size that is large enough to produce a focused spot size appropriate to the job at hand. The minimum beam diameter required is given by $D=(1.22\lambda)(F)/$spot diameter where F is the lens focal length and $\lambda$ is the laser wavelength. For example, at the wavelength of $CO_2$ lasers (10.6 microns or $1.06 \times 10^{-3}$ cm), and a focal length of 20 cm, the minimum aperture required to form a $1 \times 10^{-2}$ cm diameter spot is $(1.22)(1.06 \times 10^{-3})(20)/(1 \times 10^{-2})=2.59$ cm diameter. The area of a mirror with this aperture, designed to operate with a nominal angle of incidence of 45 degrees, and allowing for some border around the clear aperture, would be about 1.65 D$^2$, or, in this case, a little over 11 cm$^2$, and could dissipate $6.6 \times 10^{-2}$ W/cm$^2 \times 11$ cm$^2=0.73$ W at a temperature of 50° C. surrounded by air at 20° C. (A 30 C temperature rise, and an absolute temperature of 50 C) Assuming that the reflective coating reflects 99.7% of the beam, this mirror may be used with about 0.73/0.003=244 Watts of beam power, which until recently was quite adequate. However, as shown previously, with laser beam powers now in the kilowatt range, up to 25 times the allowable heat could be absorbed by such a mirror, so a new, more efficient mirror design is required if we are to avoid the complexity, expense, and system degradation active cooling can cause. We will call such a mirror a low absorption mirror.

There is a need therefore, for an economic and efficient high power laser processing system that provides improved performance of laser processing without relying on active cooling.

SUMMARY

The invention provides a high power laser processing system that includes a laser source and at least one optical element in accordance with an embodiment of the invention. The laser source provides a high power laser illumination of a first wavelength. The optical element includes a substrate that is substantially transparent to the first wavelength illumination, at least one highly reflective coating on a first side of the substrate, and at least one anti-reflective coating on a second side of the substrate. In accordance with further embodiments, the invention also provides a method of performing high power laser processing.

In accordance with another embodiment, the invention provides a method of providing a high power laser processing system comprising the steps of providing a high power laser illumination of a first wavelength, and providing at least one optical element that includes a substrate that is substantially transparent to the first wavelength illumination. At least one highly reflective coating is provided on a first side of the substrate, and at least one anti-reflective coating on a second side of the substrate In accordance with a further embodiment, the invention provides a high power laser processing system comprising a laser source for providing a high power laser illumination of a first wavelength, and at least one optical element that includes a substrate substantially transparent to the first wavelength illumination, at least one highly reflective coating on a first side of the substrate, and at least one anti-reflective coating on a second side of the substrate. Energy that passes through the mirror is trapped in a heat-dissipating structure.

BRIEF DESCRIPTION OF THE DRAWINGS

The following description may be further understood with reference to the accompanying drawings in which.

The drawings are shown for illustrative purposes only.

DETAILED DESCRIPTION OF THE ILLUSTRATED EMBODIMENTS

Applicant has discovered that high power laser processing systems may be designed to work without active cooling. This result is made possible by constructing optical elements, in particular mirrors, such that very little of the incident laser power is absorbed by the mirrors. In effect, a combination of substratum material and coating materials is chosen so that the energy not reflected passes entirely through the mirror without being absorbed, and is trapped in a structure that converts it to heat at a stationary location where the heat may be removed by natural convection or conduction or a combination.

A process for designing a low absorption mirror to fit a particular laser processing application is as follows. First, the operating wavelength and beam power of the laser to be used is determined. A mirror substrate material is then chosen that is as transparent as possible at this wavelength. The beam power in Watts is then multiplied by (1−R), where R is the expected reflectivity of the mirror. This is the amount of power that leaks through the coating. The result is then multiplied by (1−T), where T is the expected transparency of the substrate. This is the amount of the power ($P_A$) that leaked through the coating, which is absorbed in one pass through the mirror substrate. This result is then subtracted from the amount of power which leaked through the coating (1−R)−(1−T). This is the remaining power that leaked through the coating, and that can either be partially or completely absorbed by internal reflection inside the mirror, or transmitted through the back of the mirror. The degree to which it is transmitted is determined by the Fresnel reflection at the rear surface This result is then multiplied by (F), where F is the expected Fresnel reflection at the mirror back surface if the back surface is polished. If the back surface is not polished, then much of the light will be scattered back into the mirror and absorbed after a number of bounces. For example, F may equal 0.5. Add this result to $P_A$. This is the total power absorbed by the mirror in Watts. The minimum required mirror area in square centimeters is then determined by dividing the above result by $6.6 \times 10^{-2}$ W/cm². A dielectric high reflector is then constructed to achieve R for the front, using well-known thin-film coating techniques. A dielectric anti-reflection coating is then constructed to achieve F for the back using well-known thin-film coating techniques.

An example will illustrate some of the advantages of the invention. We consider a conventional mirror, and compare its performance with that of a mirror designed according to the above process. To minimize the variables, suppose a $CO_2$ laser with a beam power of 6 kW in both cases, and a silicon substrate in both cases. The conventional mirror has a polished face, and a fine-ground back. The reflective coating is gold, with a protective overcoat chosen to peak reflectivity at 10.6 microns wavelength, and the reflectivity is, therefore, 99.7%. Silicon has an internal transparency of about 0.900 at this wavelength. Going through the process steps, we find that this mirror will absorb 9.9 Watts of power. Of course, if large enough, it can dissipate the 9.9 W by natural convection. In general, the 150 cm² (nearly 100 mm diameter) mirror required to dissipate the heat naturally would be too large to fit in a laser directing head, and the power required to drive it would be economically unattractive. Using the same substrate polished on both sides however, and assuming the slightly lower reflectivity of 0.995 for an all-dielectric reflector stack and 0.5% Fresnel loss at the rear using a dielectric stack anti-reflection coating, we find that only 1.808 Watts are absorbed in the same mirror. This leads to a mirror area of 27 cm², less than 20% as large, and well within the sizes typically used in laser directors. In this case, 18 Watts of power escaped the beam at the mirror, of which 1.8 Watts were absorbed, and 16.2 passed through the mirror, and into an energy trap large enough to dissipate it harmlessly. Notice also, that this mirror aperture, (27/1.65)*−2=4.04 cm, is larger than the minimum size required to form the desired spot size.

In accordance with various embodiments therefore, the invention provides a method of causing a maximum amount of the energy that escapes the reflected laser beam to be transmitted through the mirror into a trap, instead of being absorbed in the mirror. In general, it will always produce a beam diameter that is adequate to achieve the required spot size, while minimizing the size of the mirror and associated actuator.

Figure 1:
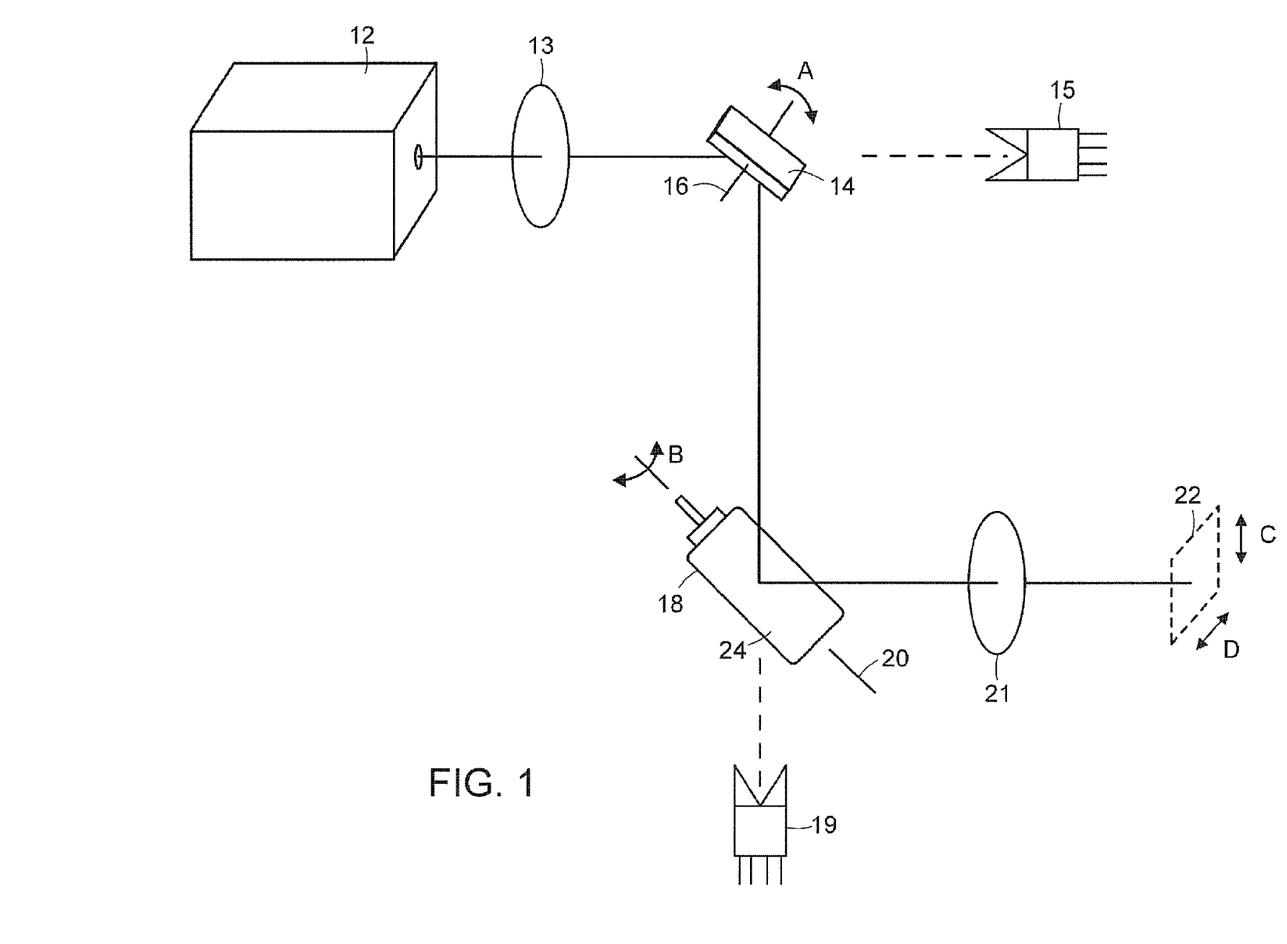
FIG. 1 shows an illustrative diagrammatic view of a laser processing system in accordance with an embodiment of the invention that employs low absorption mirrors.

This is achieved in accordance with various embodiments through use of particular substrates and anti-reflective coatings. Optical elements of the invention may be used with a high power laser processing system as shown in FIG. 1. Such a laser scanning system 10 in which a mirror of the invention may be used includes a laser sub-system 12 that directs a laser beam through optics 13 toward first mirror 14 that is rotatable about a first axis of rotation 16 as indicated at A. The vast proportion of the energy in the laser beam (99.5%-99.8%) is reflected at first mirror 14 and is directed from the first mirror 14 toward a second mirror 18 that is rotatable about a second axis of rotation 20 as indicated at B. The remainder of the energy from the laser beam is partially absorbed in mirror 14 and partially transmitted through mirror 14. It is an object of the invention to minimize the portion of the non-reflected laser beam energy that is absorbed in the mirror 14, and to maximize the portion that is directed toward a light trap 15. Light trap 15 is constructed of materials chosen to be absorptive of light at the wavelength of the laser, and the materials are arranged, for example, as an integrating sphere that has the property of reflecting the light energy a multiplicity of times internally until it is essentially entirely absorbed. Optimal operation of the laser processing system is not sensitive the temperature of the trap, so that the trap is able to respond to absorption of the energy by rising in temperature until it reaches thermal equilibrium with it's surroundings, at which point all the absorbed energy is dissipated by natural convection. In other words, the invention moves the waste heat from the mirror that cannot dissipate it without becoming overheated to a trap that can dissipate the heat. The trap may be designed to be actively cooled if desired, or it may simply have the required surface area by means of fins or otherwise to dissipate the heat naturally. The second axis of rotation 20 is orthogonally disposed to the first axis of rotation 16. The laser beam is then directed through optics 21 toward an imaging surface 22 (which may or may not be at the focal plane) from a reflective surface 24 of the mirror 18. Again, the vast majority of the energy in the laser beam is reflected, and the majority of the remainder passes entirely through the mirror and is intercepted by another trap 19. Placement of the laser beam on the imaging surface 22 may be adjusted in a first direction as indicated at C by adjusting the rotational position of the first mirror 14 as indicated at A, and may be adjusted in an orthogonally disposed second position as indicated at D by adjusting the rotational position of the second mirror 18 as indicated at B.

In alternative embodiments, mirrors 14 and 18 may be positioned on a carriage that is moveable with respect to the imaging surface 22, and the laser may be remote from and/or stationary with respect to said carriage. The laser energy may be delivered to mirror 14 by means of a focusing lens (post objective scanning), or by an optical fiber, or by other means interposed between the laser and the mirror 14. Also, a lens or lenses may be interposed between the mirror 18 and the said imaging surface (pre objective scanning).

Applicant has discovered that the temperature rise of a mirror may be kept at or below a desired maximum temperature rise above ambient, such as at or below 30° C. through careful choice of mirror materials. An objective is to limit the amount of heat that the mirror absorbs. Normal high-reflection coatings achieve between 99.5% and 99.7% reflection, leaving 0.003 to 0.005 of the energy impinging on the substrate. The amount of heat that natural convection will remove with a delta temperature of 30° C. is about $6.6 \times 10^{-2}$ W/cm$^2$ of mirror surface. The mirror absorbs the remaining non-reflected laser energy, unless the invention is employed to cause a majority of the non-reflected energy pass through the mirror.

For a typical 15 mm mirror, the surface area is about 4.2 cm$^2$, so the power removed by convection cannot be more than 4.2 cm$^2 \times 6.6 \times 10^{-2}$ W/cm$^2$=0.28 Watts. If the laser power is actually 300 W, only 0.3% of it impinges on the substrate (0.003×300 W=0.9 W). This means that the substrate can't absorb more than 0.28/0.9=31% of the non-reflected energy. If the back side of the substrate is not polished, as is the general case, all 0.9 W will eventually, by multiple internal reflection, be absorbed. If the back side is polished, then, because of the high index of refraction of silicon, much of the energy will be absorbed through total internal reflection as the front face is a high reflector.

Figure 2:
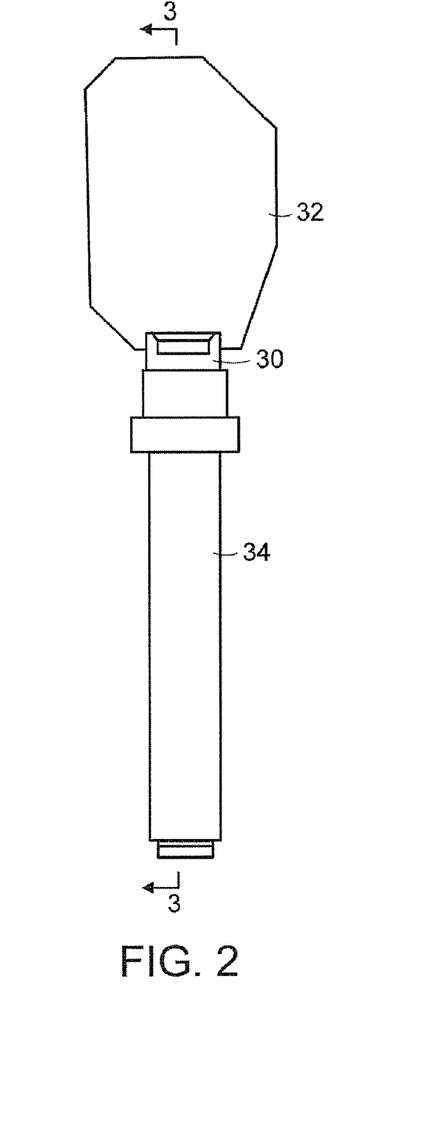
FIG. 2 shows an illustrative diagrammatic view of a mirror and rotor assembly for a system in accordance with a further embodiment of the invention.
Figure 3:
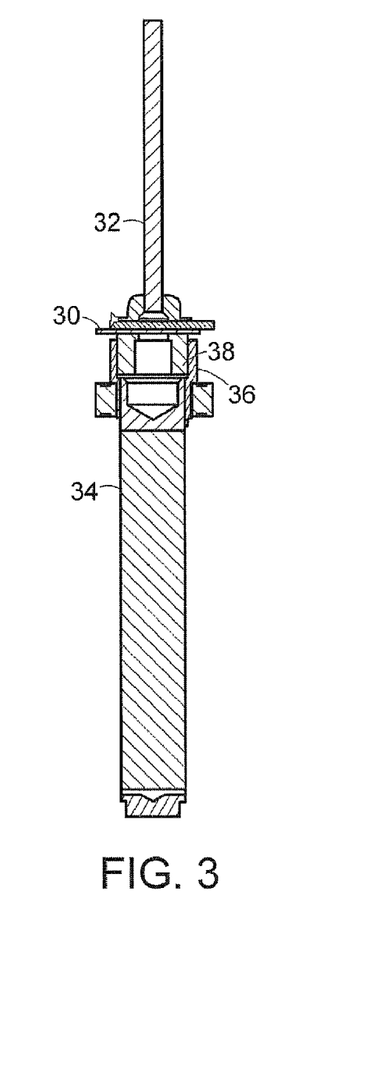
FIG. 3 shows an illustrative diagrammatic side sectional view of the mirror and rotor assembly shown in FIG. 2 taken along line 3-3 thereof.

As shown in FIGS. 2 and 3, a mirror mounting structure 30 for use in a system in accordance with an embodiment of the invention includes a transverse slot into which a mirror may be cemented, soldered or otherwise fastened, and a tapered base 38 that may be received within a tapered opening 36 in a rotor output shaft 34. This may preferably be soldered into the mount. The system may require a close CTE match between the mirror material and the mount material. For example, a quartz substrate (UV to near IR) may have an alloy 32-5 material mount, while the silicon may have a molybdenum material mount.

The back side of the mirror may be coated so that it is a very low reflector; e.g., includes an anti-reflection coating. Now, over the scan angles of incidence of interest, the Fresnel loss at the back side will be under 0.5%, and the internal transmission of silicon at 10.6 microns is about 90%. The result is that 10% of the 0.9 Watts is absorbed by the bulk absorption of the silicon, and 0.5% of the remainder is absorbed by Fresnel reflection at the back, for a total of 0.09 W+0.004 W=0.094 W, which is much less than the 0.28 Watts that can be removed at a temperature rise of 30° C., so the mirror temperature rise is lower, roughly by ½. Thus, the heat absorbed in the mirror may be removed by convection without exceeding the temperature limit of the mirror. Conventional mirrors may absorb three times as much energy in the substrate as those of certain embodiments of the invention, and 10 times as much as the best-case embodiment, modeled as follows:

CO2 Laser (10.6 Micron Wavelength)

| Conventional mirror, quartz substrate, fine-ground back | |
|---|---|
| Front side reflectivity | 0.997 |
| Internal transmittance: | 0.2 |
| Backside reflectivity: | Diffuse (0.5) |
| Power fraction absorbed: | (1 − .997)(1 − 0.2) = 2.4 × 10 * −3 W/W |
| | ((1 − .997) − (2.4 × 10 * −3))(0.5) = |
| | 3 × 10 * −4 W/W |
| Total: | 2.7 × 10 * −3 W/W |

| Conventional Mirror, quartz substrate, polished back | |
|---|---|
| Front side reflectivity: | 0.997 |
| Internal transmittance: | 0.2 |
| Backside reflectivity: | 0.04 |
| Power fraction absorbed: | (1 − .997)(1 − 0.2) = 2.4 × 10 * −3 W/W |
| | ((1 − .997) − (2.4 × 10 * −3))(0.04) = |
| | 2.4 × 10 * −5 W/W |
| Total: | 2.42 × 10 * −3 W/W |

| Conventional Mirror, silicon substrate, fine-ground back | |
|---|---|
| Front side reflectivity: | 0.997 |
| Internal Transmittance: | 0.9 |
| Backside reflectivity: | Diffuse (.5) |
| Power fraction absorbed: | (1 − .997)(1 − 0.9) = 3 × 10 * −4 W/W |
| | ((1 − .997) − (3 × 10 * −4))(0.5) = |
| | 1.35 × 10 * −3 W/W |
| Total: | 1.65 × 10 * −3 W/W |

| Conventional Mirror, silicon substrate, polished back | |
|---|---|
| Front side reflectivity: | 0.997 |
| Internal Transmittance: | 0.9 |
| Backside reflectivity: | 0.3 |
| Power fraction absorbed: | (1 − .997)(1 − 0.9) = 3.0 × 10 * −4 W/W |
| | ((1 − .997) − (3 × 10 * −4))(0.3) = |
| | 8.1 × 10 * −4 W/W |
| Total: | 1.1 × 10 * −3 W/W |

| Low Absorbance Mirror, silicon substrate | |
|---|---|
| Front side reflectivity: | 0.997 |
| Internal transmittance: | 0.9 |
| Backside reflectivity: | 0.005 |
| Power fraction absorbed: | $(1 - .997)(1 - 0.9) = 3 \times 10^{-4}$ W/W |
| | $((1 - .997) - (3 \times 10^{-4}))(0.005) =$ |
| | $1.35 \times 10^{-5}$ W/W |
| Total: | $3.13 \times 10^{-4}$ W/W |

The low absorption mirror is three and a half times less absorbent of power than the transparent-substrate conventional mirror, and nearly nine times less absorbent than the opaque-substrate conventional mirror.

In accordance with an example, a system of the invention may provide a high-power laser processing system that includes a laser source and at least one beam deflector. The laser source produces an output beam of laser energy (e.g.: $CO_2$, 10.6 μm, output power). The beam director receives (at least a portion of) the output beam of laser energy. The beam director comprises a mirror substrate (e.g., silicon) that is highly transmissive (preferably near a maximum) at a laser wavelength (e.g., $CO_2$ having 10.6 μm primary wavelength) so as to avoid substantial absorption of the beam within the substrate. The substrate has an HR coating (e.g., dielectric stack) formed on a (front) first substrate surface to reflect nearly all of the received laser energy, and also has an AR coating formed on a second (back) surface (e.g., zinc sulfide, ¼ wave thick=2.5 microns) to cause nearly all non-reflected laser energy that is transmitted through the substrate to exit the back surface and thereby avoid substantial back reflection of the non-reflected energy. The combination of the highly reflective coating (HR), substrate transmission, and anti-reflective coating (AR) limits the temperature rise of the substrate and provides for laser processing without any forced cooling of the mirror substrate. In further embodiments, the laser source may, for example, be a high power YAG laser source.

The substrate may be, for example, silicon, germanium, or zinc sulfide (for use in the infra-red), or may be, for example, quartz, sapphire, or magnesium fluoride (for use in the visible or near infra-red). The reflective coating may be formed of any of, or a combination of titanium dioxide, silicon dioxide, thallium fluoride, or zinc selenide, and the anti-reflective coating may be formed of any of magnesium fluoride, aluminum oxide, or zinc sulphide. For example, for a YAG laser system (having a center wavelength of about 1.06 μm), two sets of alternating $TiO_2$ and $SiO_2$ films may be applied as the reflective coating on fused silica, and the anti-reflective coating may be five sets of $MgF_2$ and $Al_2O_3$. For a $CO_2$ laser system (having a center wavelength of about 10.64 μm), two sets of alternating $ThF_4$ and ZnSe films may be applied as the reflective coating on silicon, and the anti-reflective coating may include two sets of alternating $ThF_4$ and ZnS films.

The director system may include a limited rotation motor system (e.g., a galvanometer system), and the high power laser processing system may be used, for example, for welding, cutting or drilling etc. The system may further includes various optical and/or mechanical components (such as articulated arms) to direct the beam from the laser to the at least one mirror. The director may be arranged in a pre-objective or post-objective arrangement (to focus the reflected laser energy on to the work piece etc.).

Preferably, the mirror is to be soldered and avoids the use of glue. This is because it is usually possible for the laser beam to pass over the joint area between the mirror and its mount. During such an accident, glue or epoxy is volatilized by the laser beam, and some of the volatiles inevitably deposit themselves on the mirror surface(s). These deposits have undesirable optical properties, including strong absorbance of laser beam energy. As a minimum, such deposits reduce the reflectivity of the mirror locally, and at worst, having "baked" onto the surface of the mirror, cause catastrophic destruction of the mirror through localized heating. Solder, if properly applied, has a shiny highly-reflective surface, high thermal conductivity, good thermal coupling with the mount, and a volatilization temperature hundreds of degrees above that of glues and epoxies. As a result, minor accidental exposure of the solder bond to the laser beam causes no harm.

In accordance with an embodiment, the beam deflector (subsystem) may be carried by a robot or other articulated assembly, and may optionally involve active cooling. The invention also provides a method of providing high power laser processing though the use of the laser frequency transparent substrate and anti-reflective coating.

Conventional mirrors typically work up to about 22 W/cm² irradiance (100 W on a 15 mm mirror), with about 0.003% absorbed power dissipated by natural convection. The dielectric coating/transparent substrate/antireflection coating solution works for powers up to about 110 W/cm² irradiance (500 W an a 15 mm mirror), because only ⅕ of the power is absorbed in the substrate as is in the conventional mirror. After that, forced convection works up to about 100 W/cm² (500 W on a 15 mm mirror), and about 2.5 kW/cm² (10.5 kW on a 15 mm mirror) respectively. For higher powers, water cooling is required to keep the mirrors near ambient temperature. Each cooling method is useful over a range of laser powers. A 60 mm mirror of conventional construction would handle 6 kW with forced convection, while a 56 mm mirror made in accordance with my invention would handle 6 kW without any active cooling.

Although often employed in the prior art, and effective in removing heat from the mirror(s), forced-convection cooling (air jets), to be effective, must impinge on the mirror(s). A force or forces due to the impingement and Bernoulli flow effects are therefore added algebraically to the mirror reaction forces as experienced by the servo system controlling the speed and position of the mirror in a typical high power laser processing system. The amplitude and direction of these forces depend on the instantaneous attitude of the mirror(s) with respect to the jets, are non-linear, and significant. As a result, both the velocity accuracy and the position accuracy of a high power laser processing system are reduced by the use of forced-convection cooling of the mirrors. In addition, the turbulent flow of heated air across the optical beam causes optical aberrations which tend to increase the size of the minimum-achievable-size focused spot, further impairing the precision of the system. Of course, the cost and complexity of the beam delivery system is increased as well. For these reasons, both the performance and the cost of high power laser processing systems are enhanced by eliminating the need to cool the mirrors.

Figure 4:
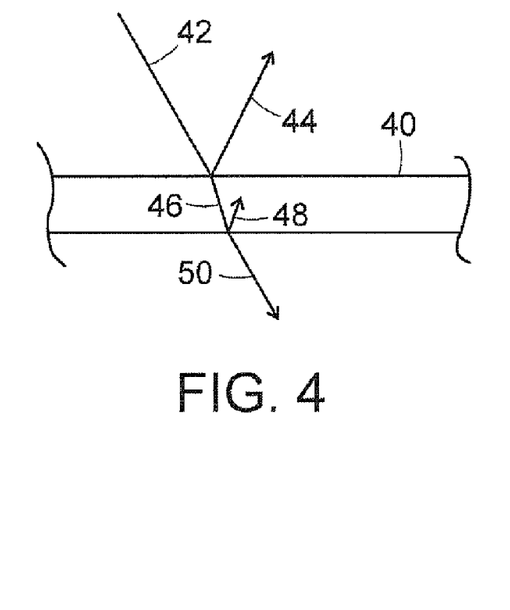
FIGS. 4-6 show illustrative diagrammatic side sectional views of mirrors for use in systems in accordance with further embodiments of the invention.
Figure 5:
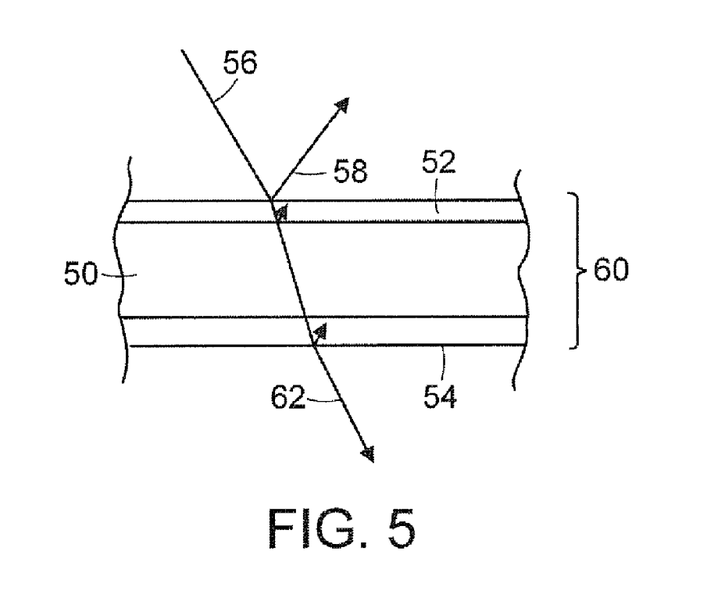

As shown in FIG. 4, an optical element 40 for use in a system in accordance with an embodiment of the invention provides a very high reflection of incident laser illumination 42 as shown at 44, while providing that any refractive energy (as shown at 46) is mostly removed from the element 40 (as shown at 50) rather than being reflected back into the element 40 as shown at 42. In particular, FIG. 5 shows an optical element that includes a substrate 50, a highly reflective coating 52 and an anti-reflective coating 54 on the back side. Incident high power laser illumination 56 is mostly reflected (as shown at 58), while any refractive illumination is designed to be removed from the element. The portion 60 of the optical element (including substrate 50 and coating 54) is chosen such that it does not absorb the laser illumination, and the anti-reflective coating 54 provides that very little of the illumination is reflected back into the substrate 50. A significant amount of the illumination that is refracted into the element, therefore, is exited the element as shown at 62.

Figure 6:
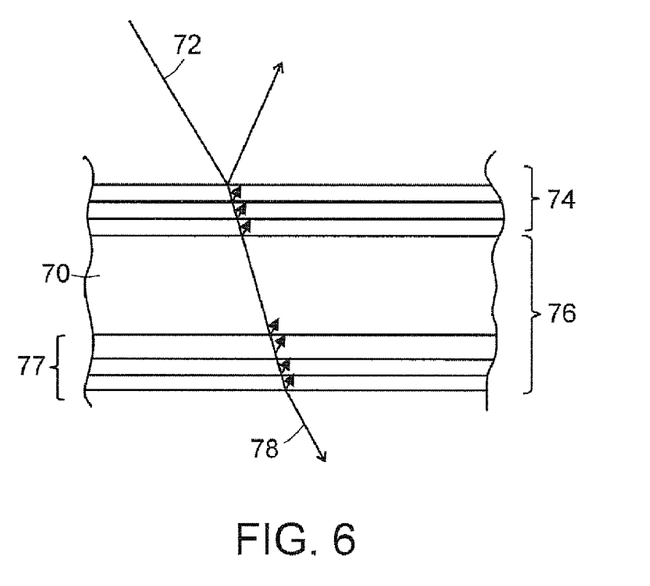

In accordance with further embodiments of the invention, optical elements may be used that include a multilayer reflective portion of a substrate that may include, for example, multiple layers of highly reflective coatings. For example, an optical element as shown in FIG. 6 includes a substrate 70 on which one side of which multiple highly reflective coatings are provided, and on the other side of which an anti-reflective coating 77 is provided. The highly reflective coatings provide a first portion 74 that is designed to provide a very high amount of reflection of incident laser illumination 72, while the substrate 70 and one or more anti-reflective coatings 77 provide a second portion 76 that is designed to rid the element of as much of the refracted laser illumination as possible as shown at 78.

Figure 7:
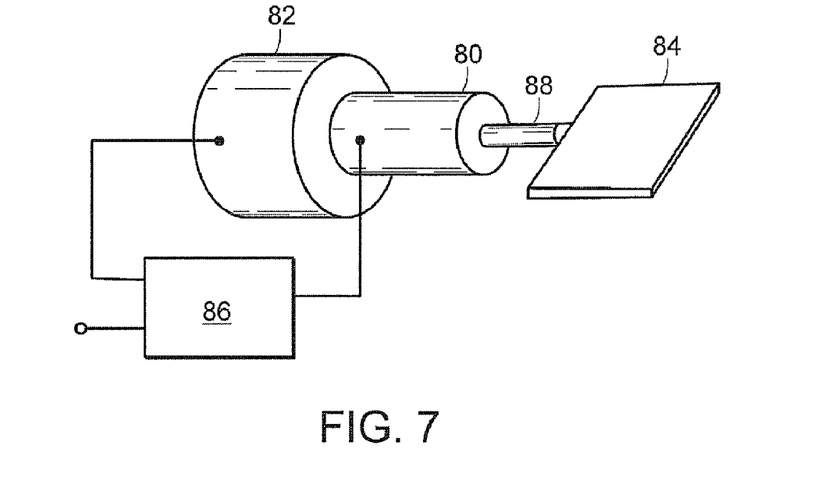
FIG. 7 shows an illustrative diagrammatic view of a limited rotation motor system in accordance with an embodiment of the invention.

As shown in FIG. 7, a scanner assembly including a rotor shaft and mirror mounting structure in accordance with an embodiment of the invention may include a scanner motor 80, having a rotatable rotor with an outer shaft 88 as discussed above, with transducer 82 for monitoring the position of the shaft attached to one end of the rotor and a scanning element 84, which may comprise a mirror, attached to the output shaft of the scanner motor 80 at an opposite end from the position transducer. The scanning element 84 and the position transducer 82 may each be attached to the rotor at the same end thereof in accordance with other embodiments. The system also includes a feedback control system 46 that is coupled to the transducer 82 and the motor 80 as shown to control the speed and/or position of the motor.

Figure 8:
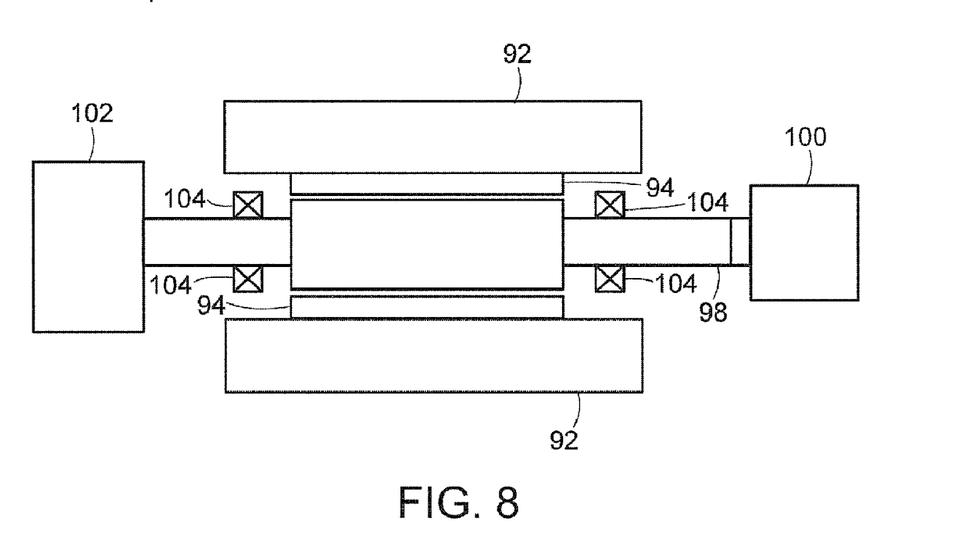
FIGS. 8 and 9 show illustrative diagrammatic side sectional views of further limited rotation motor systems of further embodiments of the invention.

As shown in FIG. 8, a mirror mounting structure in accordance with an embodiment of the invention may be used with in a system 90 that includes a back iron 92, stator coils 94 and a magnet 96 that is secured to a shaft 98. The shaft 98 is rotatably mounted to a housing structure (not shown) via bearings 104. A scanner element such as a mirror 100 is mounted to one end of the shaft 98 while a position transducer 102 is mounted to the other end of the shaft 98.

Figure 9:
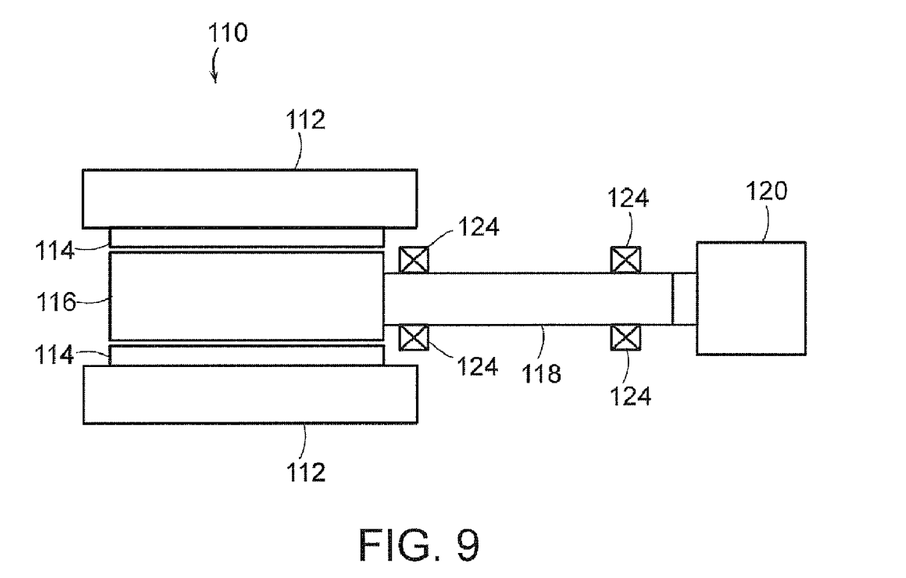

As shown in FIG. 9, a limited rotation torque motor assembly 110 in accordance with a further embodiment of the invention may include a back iron 112, stator coils 114 and a magnet 116 that is secured to a shaft 118 as discussed above. A mirror 120 is attached to the shaft via a mirror mounting structure of the invention and the shaft is rotatably secured to a housing structure (not shown) via bearings 124. The assembly 110 may further include a position transducer as discussed above.

Those skilled in the art will appreciate that numerous modifications and variations may be made to the above disclosed embodiments without departing from the spirit and scope of the invention.

What is claimed is:

1. A high power laser processing system comprising a laser source for providing a high power laser illumination at a first wavelength, and at least one low absorption positionable mirror that is selectively angularly positionable to provide reflected high power laser illumination at a plurality of selectable angular positions along a linear range with respect to the high power laser illumination from the laser source, said low absorption positionable mirror including a substrate that is substantially transparent to and partially absorptive of illumination at said first wavelength, at least one highly reflective coating on a first side of said substrate, said highly reflective coating configured to reflect a first portion of the high power laser illumination incident thereon and to transmit a second portion of the high power laser illumination into said substrate, said first portion being substantially larger than the second portion, and a second side of said substrate on an opposite side of said substrate from said first side, said second side of said substrate for receiving the second portion of the high power laser illumination through the substrate and comprising a surface that is configured to reduce internally reflected or internally scattered illumination upon incidence of the second portion of the high power laser illumination at the second side of the substrate relative to an unpolished and uncoated substrate surface.

2. The high power laser processing system as claimed in claim 1, wherein the second side of the low absorption positionable mirror comprises a polished surface with an anti-reflective coating.

3. The high power laser processing system as claimed in claim 1, wherein said highly reflective coating includes a metal oxide.

4. The high power laser processing system as claimed in claim 2, wherein said anti-reflective coating includes at least one of magnesium fluoride, aluminum oxide, thallium fluoride and zinc sulphide.

5. The high power laser processing system as claimed in claim 1, wherein said substrate includes silicon.

6. The high power laser processing system as claimed in claim 1, further comprising a beam director means, said beam director means including said at least one low absorption positionable mirror, said beam director is configured to controllably direct the high power laser beam toward a work piece.

7. The high power laser processing system as claimed in claim 1, further comprising means for delivering the high power laser beam to the at least one low absorption positionable mirror.

8. The high power laser processing system as claimed in claim 1, wherein said system further includes one or more heat-dissipating traps for receiving illumination that passes through each said low absorption positionable mirror.

9. The high power laser processing system as claimed in claim 1, wherein said at least one low absorption positionable mirror is affixed to a limited rotation motor.

10. The high power laser processing system as claimed in claim 1, wherein said laser source includes a $CO_2$ laser and said first wavelength is about 10.6 μm.

11. The high power laser processing system as claimed in claim 1, further comprising focusing means for forming a laser spot on a work piece.

12. The high power laser processing system as claimed in claim 1, wherein when illuminated with the high power laser illumination, the at least one low absorption positionable mirror undergoes a mirror temperature rise above ambient at thermal equilibrium that is at or below a desired maximum temperature rise and is below the temperature rise of a mirror with an unpolished and uncoated second substrate side.

13. The high power laser processing system as claimed in claim 1, further comprising active cooling means for reducing a temperature rise above ambient at thermal equilibrium due to absorption of laser illumination.

14. The high power laser processing system as claimed in claim 1, wherein said highly reflective coating is on an exposed surface of the at least one low absorption positionable mirror.

15. A high power laser processing system comprising:
a laser source for providing a high power laser illumination at a first wavelength;
at least one low absorption mirror that includes a substrate that is substantially transparent to and partially absorptive of illumination at said first wavelength, at least one highly reflective coating on a first side of said substrate, said highly reflective coating configured to reflect a first portion of the high power laser illumination incident thereon and to transmit a second portion of the high power laser illumination into said substrate, said first portion being substantially larger than the second portion, and a second side of said substrate on an opposite side of said substrate from said first side, said second side of said substrate for receiving the second portion of the high power laser illumination through the substrate and comprising a surface that is configured to reduce internally reflected or internally scattered illumination upon incidence of the second portion of the high power laser illumination at the second side of the substrate relative to an unpolished and uncoated substrate surface; and
a limited rotation motor including a motor shaft that is coupled to the low absorption mirror for angularly positioning the low absorption mirror to provide the reflected first portion of the high power laser illumination at a plurality of selectable angular directions with respect to the high power laser illumination for processing a workpiece with the high power laser illumination, wherein each of the plurality of selectable angular directions is generally transverse with respect to an axis of rotation of the motor shaft.

16. The high power laser processing system as claimed in claim 15, wherein said high power laser processing system further includes a light trap that is absorptive of the high power laser illumination, said light trap being positioned to capture any high power laser illumination that exits the low absorption mirror from the second side thereof.

17. The high power laser processing system as claimed in claim 15, wherein said highly reflective coating includes a metal oxide.

18. The high power laser processing system as claimed in claim 15, wherein the second side of the low absorption mirror includes a polished surface with an antireflective coating.

19. The high power laser processing system as claimed in claim 15, wherein said anti-reflective coating includes at least one of magnesium fluoride, aluminum oxide, thallium fluoride and zinc sulphide.

20. The high power laser processing system as claimed in claim 15, wherein said high power laser illumination has a power of at least about 6 kW.

21. The high power laser processing system as claimed in claim 20, wherein said high power laser processing system includes no active cooling means for actively cooling the low absorption mirror.

22. A high power laser processing system comprising:
a laser source for providing a high power laser illumination at a first wavelength;
first and second absorption mirrors that each includes a substrate that is substantially transparent to and partially absorptive of illumination at said first wavelength, at least one highly reflective coating on a first side of said substrate, said highly reflective coating configured to reflect a first portion of the high power laser illumination incident thereon and to transmit a second portion of the high power laser illumination into said substrate, said first portion being substantially larger than the second portion, and a second side of said substrate on an opposite side of said substrate from said first side, said second side of said substrate for receiving the second portion of the high power laser illumination through the substrate and comprising a surface that is configured to reduce internally reflected or internally scattered illumination upon incidence of the second portion of the high power laser illumination at the second side of the substrate relative to an unpolished and uncoated substrate surface;
a first limited rotation motor including a first motor shaft that is coupled to the first low absorption mirror for angularly positioning the first low absorption mirror with respect to a workpiece in an x direction; and
a second limited rotation motor including a second motor shaft that is coupled to the second low absorption mirror for angularly positioning the second low absorption mirror with respect to the workpiece in a y direction that is at least substantially transverse to the x direction.

23. The high power laser processing system as claimed in claim 22, wherein said high power laser processing system further includes a first light trap and a second light trap, each of which is absorptive of the high power laser illumination, said first light trap being positioned to capture any high power laser illumination that exits the first low absorption mirror from the second side thereof, and said second light trap being positioned to capture any high power laser illumination that exits the second low absorption mirror from the second side thereof.

24. The high power laser processing system as claimed in claim 22, wherein said high power laser illumination has a power of at least about 6 kW.

25. The high power laser processing system as claimed in claim 22, wherein said high power laser processing system includes no active cooling means for actively cooling the low absorption mirror.

* * * * *